United States Patent [19]

Boden

[11] Patent Number: 5,310,256

[45] Date of Patent: May 10, 1994

[54] APPARATUS FOR MIXING AND PROCESSING PLASTIC MATERIAL INCLUDING A DELIVERY PUMP

[75] Inventor: Hellmut Boden, Illingen, Fed. Rep. of Germany

[73] Assignee: Werner & Pfleiderer GmbH, Stuttgart, Fed. Rep. of Germany

[21] Appl. No.: 871,402

[22] Filed: Apr. 21, 1992

[30] Foreign Application Priority Data

Aug. 9, 1991 [DE] Fed. Rep. of Germany ....... 4126390

[51] Int. Cl.⁵ .......................... B01F 7/08; B01F 15/02
[52] U.S. Cl. ...................... 366/77; 366/191; 425/205
[58] Field of Search ............... 366/69, 77, 79, 83–86, 366/96, 97, 190–191, 194–195; 425/204, 205, 209, 145

[56] References Cited

U.S. PATENT DOCUMENTS

| 1,516,963 | 11/1924 | Johnson . | |
|---|---|---|---|
| 1,595,470 | 8/1926 | Johnson . | |
| 2,692,405 | 10/1954 | Gaylor . | |
| 2,767,437 | 10/1956 | Marshall | 425/205 X |
| 4,171,193 | 10/1979 | Rahlfs | 425/145 X |
| 4,707,139 | 11/1987 | Valenzky et al. | 366/77 |
| 4,721,589 | 1/1988 | Harris | 425/145 X |

FOREIGN PATENT DOCUMENTS

| 105233 | 4/1984 | European Pat. Off. | 425/205 |
|---|---|---|---|
| 391003 | 10/1990 | European Pat. Off. | 366/85 |
| 93020 | 10/1972 | Fed. Rep. of Germany | 366/77 |
| 3133647 | 3/1983 | Fed. Rep. of Germany | 425/205 |
| 3714243 | 11/1987 | Fed. Rep. of Germany . | |
| 3842988 | 6/1989 | Fed. Rep. of Germany . | |
| 3833777 | 10/1990 | Fed. Rep. of Germany . | |
| 3917523 | 5/1991 | Fed. Rep. of Germany . | |
| 1150253 | 5/1955 | France . | |
| 1160385 | 7/1958 | France . | |
| 58-24405 | 2/1983 | Japan | 366/77 |
| 58-183210 | 10/1983 | Japan | 366/69 |
| 59-37217 | 9/1984 | Japan | 425/205 |
| 60-244250 | 12/1985 | Japan | 425/204 |
| 1170728 | 11/1968 | United Kingdom . | |

OTHER PUBLICATIONS

Patent Abstracts of Japan, vol. II, No. 71 (JP A-6-1-228925).

Primary Examiner—Harvey C. Hornsby
Assistant Examiner—Charles Cooley
Attorney, Agent, or Firm—Ladas & Parry

[57] ABSTRACT

A mixing and processing apparatus for plastic melt is equipped with a separately drivable gear pump as a delivery unit. In order to avoid material deposits between the mixing and processing apparatus and the delivery pump, the gear pump is directly mounted at the outlet end of the mixing and processing apparatus, such as an extruder, so that the plastic melt is directly fed axially into the suction space of the gear pump. Cleaning operations after shutdown or in the case of change of material are eliminated due to this direct transfer without dead space.

5 Claims, 2 Drawing Sheets

APPARATUS FOR MIXING AND PROCESSING PLASTIC MATERIAL INCLUDING A DELIVERY PUMP

FIELD OF THE INVENTION

The invention relates to a mixing and processing apparatus for a plastic melt which is equipped with a separately driven gear pump as a delivery means.

BACKGROUND AND PRIOR ART

The use of separately driven gear pumps for conveying a plastic medium from a mixing and processing apparatus is disclosed in DE 37 14 243 Al, DE 38 42 988 Al, and DE 39 17 523 C2.

In such gear pumps, the plastic medium to be conveyed is fed centrally, by means of a connection duct, to the suction side of the gear pump between the two rotating gears therein. The medium is pumped to the pressure side of the pump by the rotating gears through their engaged teeth and discharged through a delivery outlet.

In the production of highly viscous, shear-sensitive polymers by means of screw extruders, the use of a gear pump as a delivery means is conventional. Details concerning pressure buildup, control, and regulation of the independent drives of the pump and of the mixing and processing apparatus are disclosed in DE 38 33 777 C2. The gear pump is mounted with its flange in a radial connection with an intermediate channel at the outlet end of a single-shaft extruder. In all other known applications as a delivery pump, the suction side of the gear pump is placed in working cooperation with the mixing and processing apparatus by means of a channel of varying length.

A disadvantage of this arrangement is that deposits can build up in the channel between the mixing and processing apparatus and the gear pump. This occurs particularly during periods of shutdown and upon a change of material. A considerable time expenditure is necessary for cleaning purposes which results in considerable expense. In order to resist the high pressures in the extruding of plastic compounds, it is known from GB Patent 1,170,728 to arrange conveyer screws on both sides of extended shafts of the gears of a gear pump, which screws convey from outside to inside. In addition to the considerable expense for sealing the three resulting working spaces, there is also the basic disadvantage that the conveyor screws and the gear pump must always be operated at the same speed and thus, in practice, this arrangement is either impractical or can only be used for a very few materials.

SUMMARY OF THE INVENTION

An object of the present invention is to provide a device in which a delivery pump is combined with a mixing and processing apparatus such that no material deposits can form between the mixing and processing apparatus and the delivery pump.

This is achieved in accordance with the invention by directly connecting the pump housing to the housing of the mixing and processing apparatus such that a suction space in the pump is in direct communication with the outlet opening at the end of the housing of the mixing and processing apparatus to receive the plastic material axially from the outlet opening.

Accordingly, a direct connection, free of dead space, is provided for passage of the medium from the mixing and processing apparatus to the gear pump. Deposits can no longer form between the mixing and processing apparatus and the delivery pump during shutdown times or during changes of material.

According to a feature of the invention, the drive means of the gear pump and the drive means of the mixing and processing apparatus are controlled independently of one another whereby the residence time in the mixing and processing apparatus as well as the delivery rate of the medium pumped from the gear pump can be varied arbitrarily.

According to another feature of the invention, the temperature in the gear pump is controlled independently of the temperature in the mixing and processing apparatus to advantageously influence the delivery rate.

In further accordance with the invention, the mixing and processing apparatus comprises a horizontal double screw extruder whose screws are co-rotating to produce highly viscous, shear-sensitive polymers. In this way, a smooth melting of the polymer can take place in the extruder so that the polymer melt is directly fed to the suction side of the directly mounted gear pump, without any dead space therebetween, and the pump effects the necessary pressure increase for supply of the polymer to a subsequent further processing device. Since both the double-screw extruder and the gear pump effect a self-cleaning action, a rapid changeover is assured when the material or a coloring agent is changed, due to the direct feed of the melt into the delivery pump without any intermediate dead space. An advantageous transfer from the gear pump to the subsequent device is made possible by arranging the outlet of the gear pump to face downwardly in a radial disposition relative to the pump chamber of the gear pump.

In another embodiment of the invention, the mixing and processing apparatus comprises a vertically arranged tank having a bottom, delivery outlet at which the gear pump is directly mounted so that the suction side of the pump chamber directly receives the medium from the mixing and processing apparatus. Hence, the feed of the medium from the tank to the delivery pump is assisted by gravity.

According to a feature of the latter embodiment, two screw type spiral drive members strip the inside wall of the tank and deliver the medium at their lower ends directly to the gears of the gear pump therebelow. This assures particularly favorable conditions for the pre-concentrating, homogenizing, and degassing of volatile components with an adjustable residence time in a vertical tank with a delivery end free of dead space.

DETAILED DESCRIPTION OF PREFERRED EMBODIMENTS

Figure 1:
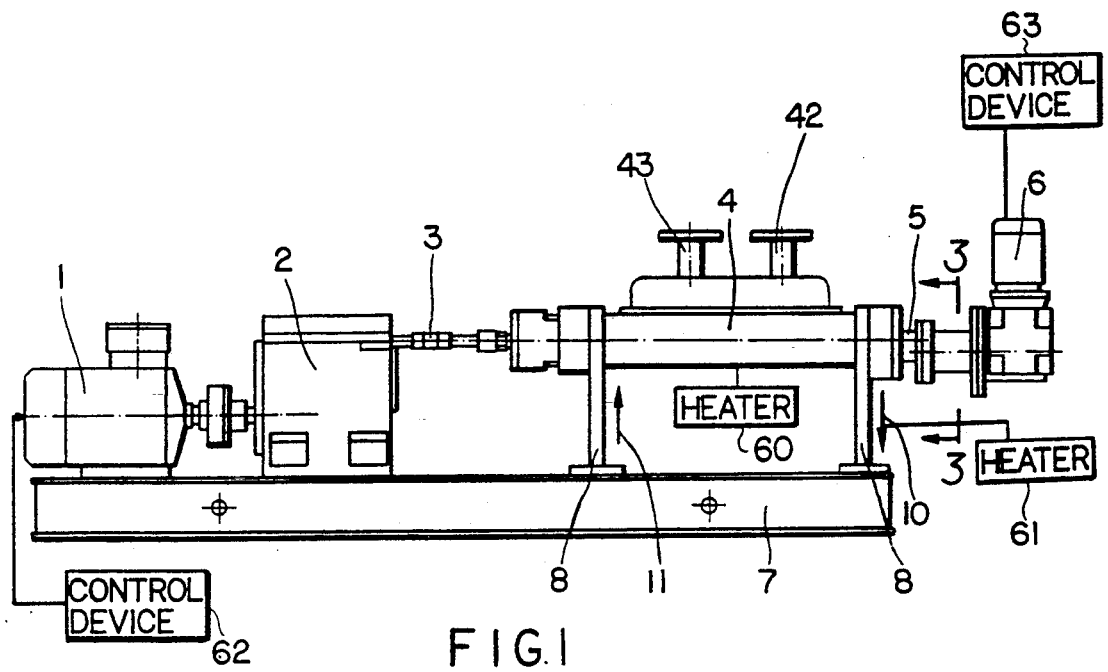
FIG. 1 is a schematic representation of a first embodiment of a screw extruder with an integrated gear pump according to the invention.

FIG. 1 shows a mixing and processing apparatus for a plastic melt which includes a screw extruder 4 supported on a base frame 7 by vertical supports 8. At the delivery end of the screw extruder 4 is a gear pump 5 which is directly mounted in pressure sealed manner at the face 41 (FIG. 2) of the housing of the extruder 4. The gear pump 5 has its own drive motor 6. The gear pump 5 includes meshing gears 51a and 51b secured on respective shafts 52 for rotation therewith. The shafts 52 are driven in rotation by motor 6. The gears 51a and 51b have side faces confronting the end faces of extruder screws 3a, 3b of extruder 4. The side faces of gears 51a and 51b have only slight clearance, i.e. that necessary for rotation, with respect to the facing ends of screws 3a, 3b of the screw extruder 4.

Figure 2:
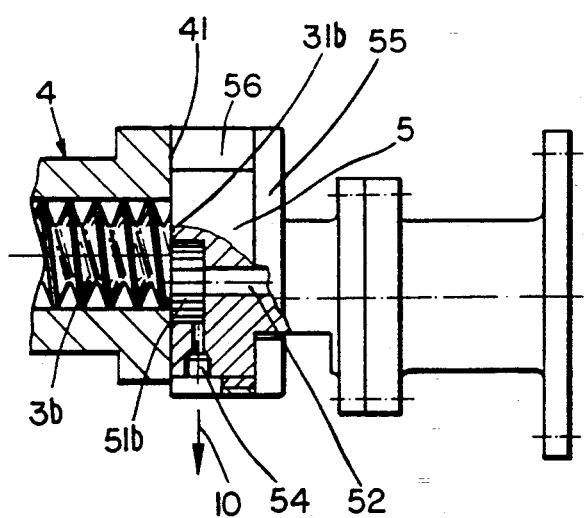
FIG. 2 illustrates on an enlarged scale a portion of the embodiment of FIG. 1 showing, partly broken away and in section, the gear pump directly engaged with the extruder.

Plastic material is introduced into an inlet of the extruder 4 in the direction of arrow 11 (in FIG. 1) and arrow 10 indicates the radial delivery of the material from the outlet of gear pump 5. A connecting shaft 3 drivingly connects a gear mechanism 2 and the shafts of screws 3a and 3b of the extruder. The screws 3a and 3b are driven in the same direction to constitute the extruder 4 as a horizontal double screw extruder. The screw extruder 4 can be degassed or additional input of material can be effected at connections 42 and 43. As seen in FIG. 2, the end face 41 of the housing of the extruder 4 and the end face 31b of the housing of gear pump 5 simultaneously form a sealed connection between the delivery end of the extruder 4 and the inlet end of gear pump 5 while providing direct connection between the outlet end of the mixing chamber of the extruder and the inlet end of the gear pump without intermediate clearance or dead space. The axes of rotation of the shafts 52 of gears 51a and 51b are offset downwardly from the axes of rotation of the screws 3a and 3b, so that a lower wedge region 44 in the nip of the overlapped screws 3a, 3b of the double screw extruder 4 communicates with a suction space 53 in the nip of the gears of gear pump 5 for feeding the melt from the extruder 4 to the gear pump 5. The displacement of gear pump 5 is at least large enough that one-fourth of the diameter of gears 51a, 51b is surrounded in a pressure-tight manner by a lower pressure space 57 in the nip at the bottom of the gears 51a, 51b. A radial discharge outlet 54 of pump 5 extends from pressure space 57 to a subsequent processing device (not shown). The melt fed to the pump 5 from the extruder 4 is passed to the inlet or suction side of pump 5 at space 53 and the melt is compressed and pumped through the teeth of gears 51a and 51b of the gear pump 5 to the pressure space 57 of the gear pump. The upper region of screw extruder 4 as well as the upper suction space 53 are thus tightly sealed by the housing of gear pump 5. The attachment of gear pump 5 to extruder 4 is effected by a pressure plate 55 and spacer 56 by bolts (not shown) joining the end flange of the extruder and the pressure plate 55. A seal ring (not shown) is interposed between the end face 41 of the extruder housing and the confronting faces of spacer 56 and face 31b of the gear pump housing.

Various constructions are shown diagrammatically in the drawing, including independent heaters 60, 61 for the extruder and gear pump respectively, and regulating and control devices 62, 63 for the drive motors 1 and 6 respectively which are independent of one another. It will be obvious to those skilled in the art that operation of the heaters 60, 61 and control devices 62, 63 can be carried out on the basis of the properties of the polymer to be processed. The essence of the invention consists in the direct conveyance of the polymer melt from screw extruder 4 into gear pump 5 without any intermediate dead space, this being achieved by direct axial communication between the extruder outlet and the suction space of the gear pump. By this means, no cleaning operations are necessary after shutdown periods or after changing materials, since the extruder and the gear pump are self-cleaning and there are no connecting channels between the two devices as known in the art.

Figure 4:
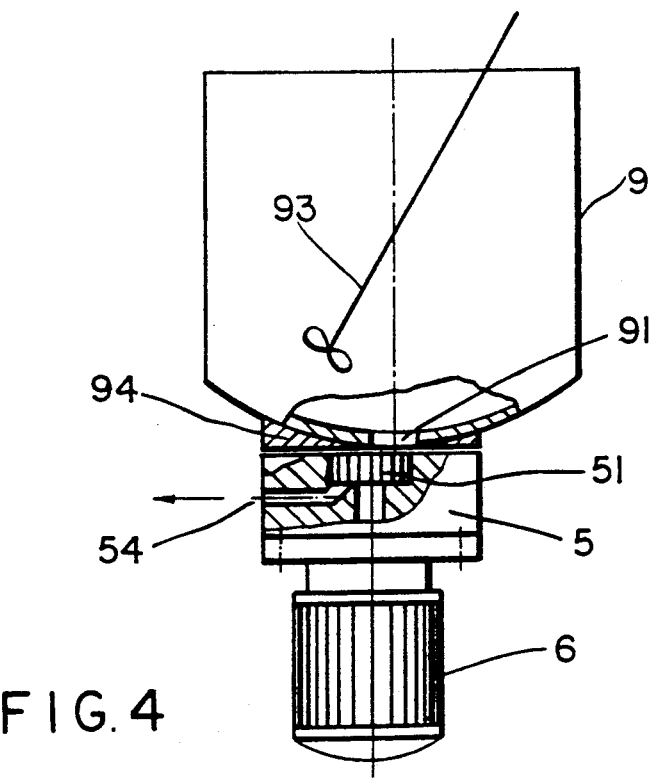
FIG. 4 is a view of another embodiment, partly broken away and in section, of a vertical mixing tank with gear pump.

FIG. 4 shows another embodiment in which gear pump 5 is directly mounted at an outlet 91 on a vertical mixing tank 9. A mixer 93 is disposed in the tank 9. The drive for mixer 93 is not shown nor is the upper part of the mixing tank with its input for the material as well as its heating means. The inlet and outlet connections for the tank 9 are not shown in detail.

Gear pump 5 is attached in a pressure sealed manner to flange 94 of mixing tank 9, such that the suction space 53 in the gear pump is precisely aligned underneath outlet opening 91 and the open face of gear pump 5 is tightly sealed by flange 94.

As in the first embodiment, there is no connecting channel present between the outlet of mixing tank 9 and the suction space of gear pump 5 in which deposits could build up. The level of the product in the tank 9 may be adjusted as desired, of course, by the separately controllable drive of the gear pump 5. The feeding of the medium to be pumped into the suction space of gear pump 5 is predominantly obtained by means of gravity. The pumped medium is discharged from pump 5 in the direction of the arrow in FIG. 4 which is perpendicular to the direction of input of the medium into the gear pump.

Figure 3:
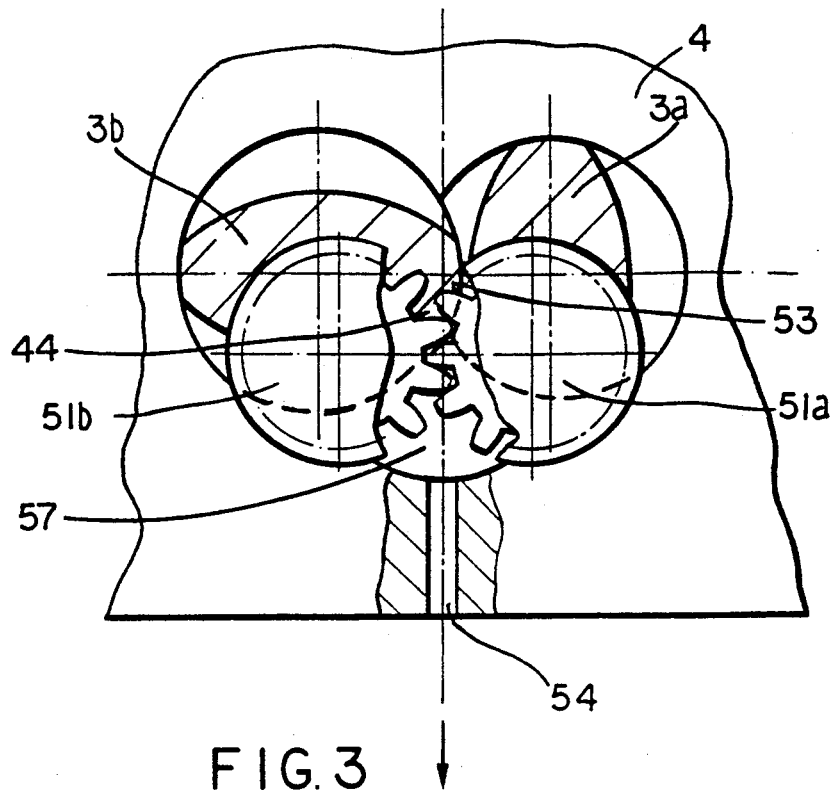
FIG. 3 is a sectional view taken along line 3—3 in FIG. 1 partially cut away.

Instead of the mixing element 93 shown in the drawing, of course, other preparation elements may be employed, for example, two screw spirals conveying the medium in the direction of the outlet and at the same time cleaning the inner wall of the mixing tank as in the embodiment of FIGS. 1-3.

Although the invention has been described in conjunction with specific embodiments thereof, it will become apparent to those skilled in the art that numerous modifications and variations can be made within the scope and spirit of the invention as defined in the attached claims.

What is claimed is:

1. Mixing and processing apparatus comprising:
   a mixing means for mixing a plastic material including a housing having an outlet end with an opening for delivery of mixed plastic material therefrom, a mixing element in said housing and drive means for driving said mixing element; and
   a gear pump connected to said mixing means for receiving plastic material from said mixing means and for pumping the plastic material for discharge from the gear pump, said gear pump including a separate drive means independent of the drive means of the mixing element of said mixing means, said gear pump including a pump housing directly connected to the housing of said mixing means, said pump housing having a suction space which is in communication with said opening at the outlet end of the housing of the mixing means to receive plastic material from said outlet end directly, said mixing means comprising a horizontal extruder in which said mixing element comprises two rotatable screws in the housing of the mixing means, said housing of the mixing means including a flange against which the housing of the gear pump is directly engaged in face to face sealed relation; said gear pump including gears having faces confronting end faces of said two screws in close proximity, said gears of the gear pump having axes of rotation disposed at a lower level than axes of rotation of said screws such that a lower wedge region in a nip between said screws is horizontally aligned with a suction space formed at an upper nip between the gears of the gear pump so that plastic material is fed directly from said lower wedge region of the screws to the suction space of the gear pump.

2. Mixing and processing apparatus as claimed in claim 1 comprising means for independently controlling the drive means of the mixing means and the drive means of the gear pump.

3. Mixing and processing apparatus as claimed in claim 1, wherein said housing of the mixing means and the housing of the gear pump are separate and independent enabling each to be temperature controlled independently of the other.

4. Mixing and processing apparatus as claimed in claim 1, wherein said gears form a lower nip defining a pressure space and said housing of said gear pump has an outlet opening extending radially downwards from said pressure space for discharge of plastic material.

5. Mixing and processing apparatus as claimed in claim 1, wherein said two rotatable screws in the housing of the mixing means are tightly fitted in the housing of the mixing means to strip plastic material from inside surfaces of the housing of the mixing means as the screws rotate to transport said plastic material to the opening at the outlet end of the housing of the mixing means.

* * * * *